US006496773B1

(12) United States Patent
Olsson

(10) Patent No.: US 6,496,773 B1
(45) Date of Patent: Dec. 17, 2002

(54) METHOD AND MEANS FOR NETWORK CONTROL OF TRAFFIC

(76) Inventor: Kjell Olsson, Såningsvagan 17, S-175, 52 Jårfålla (SE)

( * ) Notice: Subject to any disclaimer, the term of this patent is extended or adjusted under 35 U.S.C. 154(b) by 0 days.

(21) Appl. No.: 09/601,116

(22) PCT Filed: Jan. 15, 1999

(86) PCT No.: PCT/SE99/00043

§ 371 (c)(1), (2), (4) Date: Jul. 27, 2000

(87) PCT Pub. No.: WO99/41726

PCT Pub. Date: Aug. 19, 1999

(30) Foreign Application Priority Data

Jan. 30, 1998 (SE) .............................................. 9800280

(51) Int. Cl.[7] ....................... G06F 165/00; G06F 19/00; G06F 7/70

(52) U.S. Cl. ....................................... 701/117; 701/118

(58) Field of Search ................................ 701/117, 118, 701/200, 119

(56) References Cited

U.S. PATENT DOCUMENTS 3,120,651 A 2/1964 Hendricks
3,660,812 A 5/1972 Inose et al.
4,167,785 A 9/1979 McReynolds et al.
5,635,924 A * 6/1997 Tran etal. ................... 340/905
5,668,717 A 9/1997 Spall
5,703,778 A 12/1997 Takahashi et al.
5,812,069 A * 9/1998 Albrecht et al. ............ 340/905
5,822,712 A 10/1998 Olsson
5,999,877 A * 12/1999 Takahashi et al. .......... 701/117
6,177,886 B1 * 1/2001 Billington et al. .......... 340/934

FOREIGN PATENT DOCUMENTS

WO WO 96/36929 11/1996

* cited by examiner

*Primary Examiner*—William A. Cuchlinski, Jr.
*Assistant Examiner*—Olga Hernandez
(74) *Attorney, Agent, or Firm*—Connolly Bove Lodge & Hutz LLP; Larry J. Hume

(57) ABSTRACT

The invention relates to a method for detection and prediction of incidents and traffic queues formed by overloading. This is done in real time with use of sensors in a road network. Predictions are used also to reach a faster and more reliable detection. Sensor measurements are also used in the process, where the comparison with expected values are used for successively updating stored parameter values for the involved algorithms. By this, the system can succeedingly adapt itself for changed situations. The strong traffic variations, that are naturally occurring at short time intervals are treated with the use of noise-based methods. By this, there are formed distribution related measures as e.g. the standard deviation, which can be estimated from measurements, and submit a base for estimating probabilities for deviations of a certain size, e.g. related to the standard deviation. Automatic incident detection (AID) is based on determination of the desired false-alarm rate, and the related threshold level. The method includes accumulated measurements. Faster and more reliable incident detections are received with the use of the invented prediction process method.

24 Claims, 10 Drawing Sheets

Traffic Management System

METHOD AND MEANS FOR NETWORK CONTROL OF TRAFFIC

THE INVENTION

The invention concerns a method and means for maintaining and using a large capacity at a road network. It includes performing the method during time periods, when there are large traffic volumes and needs for large capacities. The method is focusing on reductions of blockings and risks for blocking of flows on links in a road network. One method step is limiting upstream flow to reduce risks for blocking of a downstrearn link. The method is using several method steps at different levels. Those steps cooperate to make a traffic management possible, which works in real time with traffic network functions.

BACKGROUND

Prior Art

Traffic volumes are large during rush hours, and there are built up queues at the road network in and outside large cities. It is difficult to get space for more roads and those are expensive to build. By using advanced information technology, the present capacity of the road network can be used more efficient and larger traffic volumes can be managed with less additions of new road capacity.

This matter is reflected by the large interest devoted for ITS, Intelligent Transport Systems. within EU, US and Japan and others during the nineteen nineties.

However there are no solutions known yet, why there are large amounts of money put into research in the field, and various ideas are studied.

Traditionally one has tried to solve capacity problems at the road network, by building more roads or taking actions at those points, where the problems appear. If there are long queues on a road upstream of an intersection, one is trying increasing the passability through the intersection for the cars on the said road. This is the traditional way of regarding traffic problems. The problems are narrow sections at the road network. At those points traffic queues are arisen, and then the solution is regarded to be increasing the capacity at those points.

With more knowledge in traffic and the network characteristics of traffic, the traditional "point oriented" way of work seems superficial and providing shortcomings. Resulting "solutions" might create larger problems than the problem considered. An example is given as follows.

It is common that there are queues on the entrance roads of large cities during the morning rush hours. A queue might arise at a narrow section, eg at an on-ramp to the entrance road, and one might increase the passability here, e g by adding an extra lane. The resulting increased flow might come to a stop at a "new" narrow section close downstream, whereby queues are created here instead. The queue at this new position might create larger traffic problems than the queue at the first position.

There are needs for a more system oriented way of work to solve traffic problems at road networks.

Methods described in literature are mainly concerning light signal controls of intersections. Most of the methods are point oriented and concern optimising one intersection for increased capacity. There are also various methods connecting controls of a few intersections along a larger traffic "arterial" to produce a synchronised control of those intersections, a type of "green wave". The green wave however is a "solution" that is focusing on one of many aspects for a road network, like the corresponding "point oriented" way of work. The negative consequencies for traffic can grew large. It is also common to change methods from e g "green wave" to independent intersection control, depending on the traffic load In those cases a dilemma arises utilising the full intersection capacity. For timeplan controlled intersections there should be a full outflow at green signals from each inlink to the intersection. This can be done if each link contains queues, which supply the whole green periods with passing cars. Queues however are not desired from other points of views. They increase travel times (and drivers' stomach acidity).

There are intersection controls, which to a larger extent adapt the green time length according to the amount of cars that are on the road. By measuring the flow a bit upstream, one knows if there are more cars arriving, and can increase the green time period correspondingly. In this way more green time can be taken from a link, that doesn't need its share, to a link that needs more.

In short, there have been large efforts focused on obtaining increased passability through intersections. That is also a natural consequence of the matter, that a light signal controlled intersection only provides 20–40% of the inlink capacity. Variations in capacity depend on the intersection design, the share of left turnings, safety aspects and the used timeplan policy. The present invention also concerns providing large capacities. In the invention however the network orientation is dominating and system oriented solutions are invented. Those solutions consider the network capacity in a management coordinating way. Also in the present invention the capacity of a single intersection is of interest. But then it is related to other requirements and conditions.

The present invention differs already in applying a different problem view on traffic, compared with the traditional one, described above. The invention includes a new way of considering traffic problems, a new way of managing traffic and a new way of solving traffic problems.

We will start looking on some traffic problems, and we start simply with problems related to intersections, as such matters were discussed above.

The Invention Problem View

Example on traffic problems.

Let us choose a light signal controlled intersection.

A link entering the intersection consists of two lanes, which closest to the intersection have been extended with an extra third lane, for those cars turning to the left. This extra lane has got space for five cars in a row. When the signal is green for cars heading straight, it is red for the left turning cars. When the left-turning lane is full of cars the rest of the left turning cars have to queue up in the ordinary left lane, why there only is left one lane for those heading straight. Then the passability is halved, and the cars that don't get time to pass during the green period, are queueing up in both lanes.

When green for left turnings, those cars in the left-turning lane can pass the intersection. Those cars stopped behind in the queue, cannot pass the queueing cars in front of them and thus cannot utilize the green time for turning left. New cars are let in to the link from the upstream intersection. Those cars add on to the queue. When the light signal turns green again for going straight ahead, the passability once again is reduced, after that the left-tuming lane has been filled.

Left-turning cars are blocking the "straight ahead" flow, and "straight-ahead" cars are blocking the left-turning flow. The capacity out from the link is decreasing, and if the capacity and flow in to the link is unchanged, the queue on the link is growing, until the queue is covering the whole link. Then cars from the upstream intersection cannot enter the link, although it is green light for the entrance roads to that intersection. This results in queues of stopped cars on the entrance roads, though the signal is green. Those queues in their turn block those cars on the entrance roads, that are heading for other roads out from the intersection. Thereby the outflows from all three entrance roads can be blocked, and their respective capacity turns to be very low, why the queues on those three links grow very fast and reach their respective upstream intersection, which in its turn is blocked, whereby its three entrance roads will be blocked and so on.

Observe that the blocking effect might give a very large gearing effect concerning the reduction of capacity. Say for instance that the first link (1) in the example above, gets its capacity reduced to ⅔. Upstream entrance road (2), which includes right-turing cars in to the first link, might get further reduced capacity. If right-turning cars consist of 20% of the flow of link (2), and ⅔ can pass into link (1), this at first gives a reduction of the total flow on link (2) of only 20% of $\frac{1}{3}=\frac{1}{15}$. But the rest $\frac{14}{15}$ of the flow cannot pass the intersection freely, because right-turning cars are queueing and blocking one of the two lanes. If the rest, 80% of the original flow, is limited to one lane, the total capacity might be reduced by some further 30%, which might imply that the outflow from the link now is limited to some 20% of the basic link capacity (60% related to the node,—or less if also left-turing and straight-heading cars are blocking each other). That is valid when (2) has got two lanes. On smaller streets with only one lane, the blocking might reduce the capacity with 40%, i e the outflow from the link is small and queues can grow very fast upstream to the next intersection etc.

We see that blockings can cause large capacity reductions in a road network. Capacity reductions are also spread easily from a source on a link to whole areas of the road network. It is not required that there is an accident or a defective car, that causes the blocking. The natural cause at our large traffic volume city-areas, is traffic overloading. The inflow of traffic is larger than the link or the intersection can carry. See the following example.

We study the conditions in a four-road intersection. There is a timeplan for the traffic light control, which has been adapted to the normal traffic case and the normal distribution of traffic flows through the intersection. However the real traffic distribution is varying, and is statistically much different from the average distribution. This fact is remarkable during such short time periods as the green time periods of traffic lights, i e in the order of 30 seconds and below. It means that the integrated flow entering a link (1) from three entrance links (2, 3, 4) statistically might be remarkable larger than the average distribution. If this flow is let into (1), the in-flow is larger than the out-flow from (1), and a queue is built up on (1), with probable blocking consequencies as a result. By limiting the out-flows from (2, 3, 4) by the traffic lights, there are queues on those links instead, with possible blocking of traffic flows as a result. The blockings are decreasing the output capacity from the links, why the queues are extended and the blockings are maintained, and are spread across the network.

To get rid of a blocking, arisen on a link, the flow into the link has to be reduced below the level of the out-flow, and as the blocking has reduced the out-flow, there are substantial reductions required of the in-flow. That reduction of the in-flow to the link means reductions of out-flows for one or more upstream links. Thereby queue build up and blocking might arise on those links, whereby the in-flows to those links have to be reduced and so on.

The invention concerns a solution on the given problem above, blocking of traffic. One part is focused on reductions of in-flows in time, before blockings have arisen. Then there are less corrections required, and actions can be taken locally without larger consequencies for other parts of the network.

We see from the above example that there are not only incidents that are causing traffic problems. But also natural short term variations in traffic flows are sufficient to cause disturbances, which in their turn cause blocking effects. Those might grow large and be spread across the network. And one doesn't need to prerequisite that something unusual must happen. It is sufficient with the large traffic flows on the roads into the city each morning, for queues to arise here and there. This is not by itself very serious. The large negative consequences are attained, when those queues create blockings. Then the queue growth rapidly increases and new blockings are created. Blockings are spread across the network. The result can be seen at the morning rush hours: When we need the large capacity of the road network the most, the traffic is blocked and the useful capacity is at its lowest level.

When a queue has grown upstream to a node and is blocking the node, it doesn't help if the node is equipped with some of the above described light signal controls. It doesn't help showing green light if traffic anyhow cannot move forward.

According to the view of the invention on problems, known traffic concepts and suggestions for solutions are mainly directed at the symptoms of the problems or problems of insignificance. Most of the advanced work done, to fine tune the capacity in light signal controlled intersections, turn unuseful in real overload situations and blockings.

Simply expressed. the traditional methods are based on working downstream with the traffic. E g successively removing narrow sections, whereby the flow is increased downstream, until it is caught by a new narrow passage. This strategy doesn't reach success, until the whole network is expanded to such a large road capacity everywhere, that traffic, not even when reaching its worst peaks, reaches the capacity limit anywhere. This case is and has been unrealistic to attain for large cities the last decades.

Traffic planners' usual attitude is "giving in" saying, that they don't get rid of the queues, because increasing the passability, the traffic increases, and there will be queues anyhow.

Basic Principles of the Invention and Solutions of Traffic Problems

According to the invention, the successful strategy is working with management systems in control of traffic, and then working opposite to the traditional way. A main principle is wordking upstream against the direction of the traffic.

Simply stated, the system shall not let through more traffic into a link or through a node than the following link or node can handle. This means that the control requirements are transferred upstream. The out-flow from a link may need to be limited, as a downstream link doesn't cope with the whole in-flow. But if this link out-flow is made limited, also this link in-flow has to be limited correspondingly, and thereby also upstream links might need to be limited. This upstream feedback of limitations of flows is necessary, to prevent creations of blockings. Blockings also are spreading upstream. So the traffic control has to be faster, and be able to be fed upstream faster than the blockings are spread.

The fundamental principle for traffic control is; don't let more traffic in than what can pass out. This means consequently, that it is interesting to try to increase the "output traffic". In such a case more traffic can be put in. The question if more traffic can be put in, however is not that simple just looking at the exit point, which is the traditional way, and as said above might lead to advanced optimisations of e g an intersection control to increase the output from a link.

No, first one has to study the road network downstream. Will that be able to handle the increased inflow, which will be the result of the said increased output flow? If the answer is no, the result of the fine tuning of the said intersection control might—(not be meaningless), but negative. If it would be carried out, a queue would be growing up to the intersection and block that one. Thereby the intersection obtain still less capacity than what it would have initially, and instead of getting increased output flow, it gets decreased flow. The result thus becomes opposite to what was the purpose.

According to the fundamental principle, the management system shall instead rapidly make upstream feed back of the decreased output, and limit the in-flow to the link by limiting the out-flow of upstream links.

And the management system has to react fast, before queues and blockings have spread further upstream.

It is first when upstream flows have decreased that much, that the queues have begun to decrease and the original blocking has resolved, that the traffic flows can be increased again to the original level.

A prerequisite for increasing the flow at a point is that downstream parts of the road network can handle the extra flow. This is completely according to the fundamental principle and implies that the control requirements are applied in the upstream direction.

Short Description of the Invention

The purpose: The invention makes possible the solution of the large traffic problems, which characterise the traffic in the large city areas of today. The invention identifies the major problem and provides a method and means for solution of the major problem.

The invention concerns a method and means to maintain and utilize a large capacity in a road network. It includes performing the method during time periods when the traffic volume and the needs for capacity are large. The method is concentrated on reduction of blockings and risks for blockings of flows on links in a road network. A method step is to limit upstream flows to reduce risks for blocking of downstream links. The method is using several method steps at different levels. Those steps cooperate to make traffic management possible, that works in real time with the network characteristic functions of traffic.

Figure 1:
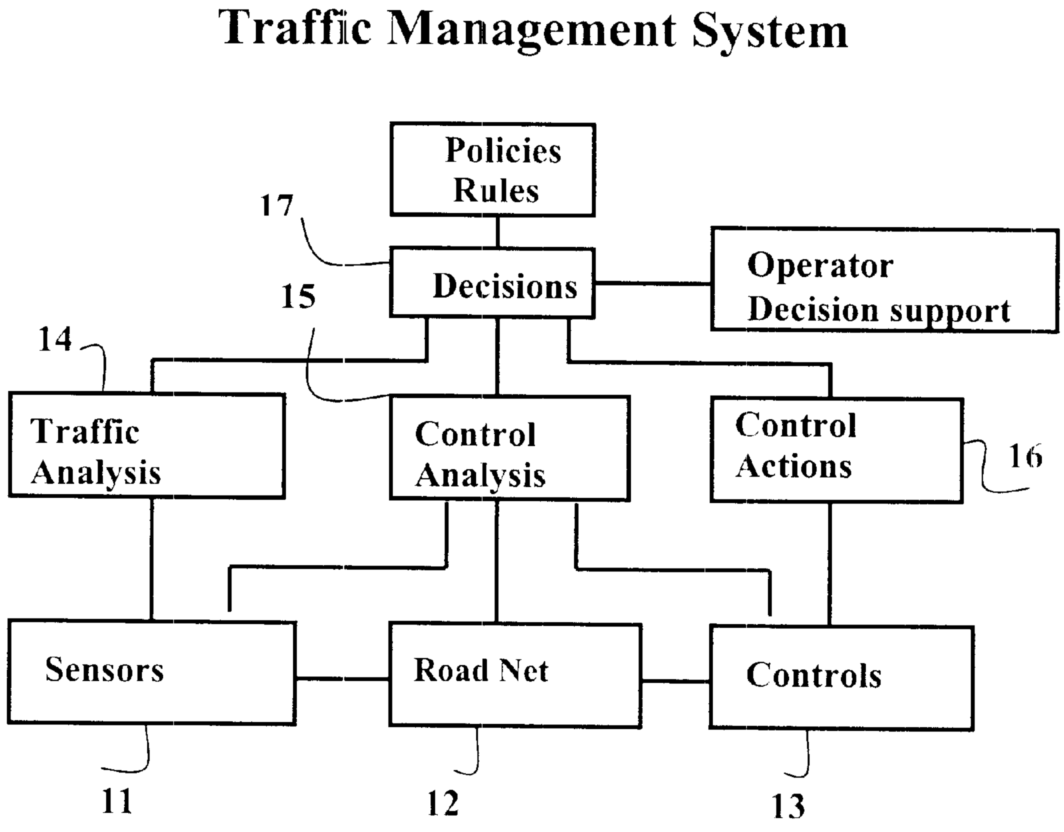
FIG. 1 illustrates a road network including links and nodes.

Level 1. Determination of Rations for Individual Links at the Road Network

This method step creates rations for the links. The rations correspond to the actual mean traffic demand for the time period (the basic demand), and the method step gives an effective utilisising of the road network. When traffic is managed according to the given rations, the risk for overloading and traffic collapses is decreased. The risk for queues growing and blocking the traffic flows is also reduced. Intersection controls have been given respective ration-settings, which aim at maintaining the ration values for the link flows. The out-flows from entering links to a node are limited, such that the in-flows to the exit links are not exceeding the respective ration.

Example: The subflows of a link might be strongly askew, e g the straight forward direction, St, might be unproportionally large compared to the directions to the left, Le, and right, Ri. With direction is meant the direction of the out-flow in the node. The direction Le thus indicates cars turning left, into the left exit link. St indicates those that continue in the same direction on the exit link across the node. The traffic management then will limit the St flow to its ration, and provide more green time for Le and Ri than there are cars. A consequence might be that a number of original St-drivers would prefer to utilise Le or Ri, rather than waiting in queues for St. The route choice is less critical for some drivers than for others. Hereby a natural distribution is obtained of flows on other roads, when the flow is too large on a link. The road network will be better utilised, at the same time as blocking queues are avoided.

In management of traffic for effective use of the road network, information can be given to drivers at selected positions in the road network, preferably far upstream the narrow section, to which one wishes to decrease the flow. That can be made by information on signs about topic traffic conditions. Problems and actions that are repeated daily are learnt by the drivers, who also adapt themselves. By time a traffic flow on the road network is obtained, which is better adapted to the ration distribution, and thereby the network is better utilised.

The above description gives a rough and idealised view of the reality. It is much more difficult than that to solve the real traffic problems. However that method step including the use of rations gives a qualified starting point for the following method step. The ration distribution and the controls give a kind of average value oriented control, from which it is easier to make corrections dynamically than starting totally from the beginning. For providing rations the method step at level two can be used. That is described below.

Level 2. Dynamic Rations

Ration values need corrections dynamically adapted to the real traffic situations. The flows vary naturaly statistically from the averages. Besides there are variations caused by introduced events as football matches, school holidays and roadwork. There are variations due to the weather, which cannot be controlled, but to a certain level can be predicted, and there are incidents, which can neither be controlled nor be predicted. There are causes of variations, which effect the whole road network, e g weather, and there are local incidents. Incidents can locally have very large effects and totally block certain links. The effect of an incident can also spread across areas both in parallal with and upstream the first affected link. Thus the need is large for measuring and controlling the present traffic in relation to the valid rations of the road network. The traffic variations might have a long duration. days and hours. where the traffic management system got time to successively change the traffic management for the new situation. The traffic also has got fast statistic variations, which locally and during the short control periods give rise to large percentage variations, tens of percents. The dynamic variations of rations shall follow the traffic variations, and the rations are therefor corrected with different fast time constants. Thus there might simultaneously be ration variations in progress within different frequency areas.

Example on measurements.

The flow on a link is continuously measured regarding Le, St and Ri. Le implies that this subflow will turn to the left in the node and into the Left exit link. The other subflows distribute themselves to the exit links Straight ahead and Right. By measurements the system gets early information on the size of the flows on the downstream exit links. If all subflows of the entrance links are measured, the total flow is obtained for each exit link. The flow to a link is put together by a Le from one link, a St from another and a Ri from a third. That creates possibilities to control the amount of flow to each link by controlling the flow on at least one of the upstream links.

If the measurement is done early (upstream) on the link the system gets more time for analysing and reaction. If the measurements show that a downstream link will get a larger in-flow than what the ration says, there are several possible actions:

a. The whole or a part of the flow can be let through to the downstream link, which has a margin to handle a larger in-flow:
   - a1. Ration margin. The ration is put at a relatively low value to keep a low risk for blocking. There is a probability that the link can handle a short term extra flow.
   - a2. Out-flow margin. The out-flow is put together in the shape of subflows with other link subflows to generate in-flows to the exit links of the node. There is a probability that the downstream node and links can handle a short term larger out-flow from the link.
   - a3. Buffer margin. The link can handle an extra queue, without beings blocked.

b. The whole or a part of the flow is taken care of on the topic link, where the measurement was done.
   - b1. The out-flow is limited by the link control means for out-flow.
   - b2. The link buffer margin is utilised to store the extra volume.
   - b3. Limitation of those subflows of the upstream links, which are subflows of the in-flow to the topic link.
   - b4. When needed the action (b3) is fed back further upstream.

The fast short term actions of (a) and (b) above are made on level 3, which is described below. On the topic level, level 2, there is partly a gradual updating of rations, partly a gradual updating of selected margin values. Added to that there is a need for corrections of said ration- and possibly margin values, caused by occasional changes of the traffic. Those variations are summarised under the notation; conditional variations, to separate them from the fast often statistical "short term"-variations, which are treated on level 3.

In short: Starting with the valid rations, traffic is measured at the network The rations are adapted to the actual traffic, partly by gradual updating of earlier ration values, partly by dynamic variable ration values. The dynamic variations include conditional variations as events, incidents, weather and more or less traffic dependent causes.

The method of adapting rations to the actual traffic, can be used also in stating the rations on level 1. Different traffic situations can be simulated on the topic road network and the management system according to the invention, can distribute the traffic flows and rations according to level 2. The ration determination can be done interactively with an operator, who also can prescribe certain conditions, e g a maximum utilising of certain routes, minimum utilising of e g roads in resedential areas. The operator can e g put in limitations or rations, which are substantially smaller than the possible capcity.

On level 2, thus the global adaption of the traffic flows to the road network is done, dependent on the conditional actual traffic situation or (from the drivers' view) the integrated transport demand.

Level 3. Short Term Variations

On level 3 the local fast variations of traffic is treated. The measurements and the points (a) and (b), which were described above at level 2, are also the basis for the description on this level. The measurements of the flows at the different lanes upstream a node indicate how the traffic distributes itself on the exit links from the node. The measured values can also be used for prediction of flow distributions in downstream nodes according to the method in patent Sv9203474-3. The requirements are short measurement times and fast actions to control the traffic in time for blockings to be avoided. Predictions create a basis for preparations and time margins. Below some numerical examples are given, which illustrate the orders of magnitudes of distances and times in topic processes. The examples are simplified.

Some numerical examples.

An intersection has a timeplan of four phases on totally 100 seconds. During 35 seconds the respective main direction has green: Straight ahead (St) plus turn to right (Ri). During respective 15 seconds the respective main direction has green only for left turn (Le). The total time 2*35+2*15=100 seconds includes green—yellow—red changes with time margins for traffic to leave the intersection before the next flow is arriving. There is neither any special walk and bicycle passages included in the calculation. The effective green times therefore might be somewhat less, e g 10% less, dependent on which policy is applied.

If the distribution of traffic out from a link is St: 50%, Le: 20%, and Ri: 30%, then 80% can utilise at most both lanes during a green time of about 30 seconds. It accounts to 30 cars out, of which 19 are St, and 11 are Ri. Left turning ones have hardly 14 seconds to get 7 cars passing out. It makes 37 cars in 100 seconds, which gives an average flow of 0,37 cars/second. The maximum flow of a road with two lanes is about 1,3 cars/s. If left turning was excluded in the intersection, the capacity would increase to about 0,47 cars/s. If instead left turn and straight ahead directions got equal parts of the total flows, the capacity would decrease to 0,22 cars/s.

The above capacity values are obtained if the light control times are adapted to the actual flow distribution. The flow distribution however varies strongly. Then the really obtainable capacity decreases, queue growth arises and thereby also blockings can arise. Traditional traffic light signals have no fast update of timeplans, why the timeplans often are misfitted also to the average flow distribution values. Then also the real capacity turns lower. The capacity values, said above, are also valid under assumptions that the flows are not blocking each other. At blockings the flows can be much lower as said earlier.

At a velocity of 50 km/h cars travel about 400 m in 30 seconds. Building blocks in cities may be 100 m, 200 m and longer. If the distance between intersections is substantially shorter than 400 m, their light signals need to be synchronised. Otherwise the timeplan cycle might be required to decrease, and by that the efficiency.

If cars are queueing up standing still, there would be a queue length of about 150 m, covering those cars that would have passed an intersection in 30 seconds green time. Queues might grow very fast.

At short distances between light signal controlled intersections the green times need to be much shorter than at the example above, perhaps half the time.

At a street network the traffic distributions and volumes are varying from one intersection to another. It is therefor not obviously suitable synchronising many intersections to each other. It is today regularly unsynchronised intersections in a road network. Then the in-flow to a link is unsynchronised to the out-flow from the link, and the link needs to be long enough to be able to buffer the entering cars in a queue.

We saw from the given example above, that a period of 30 seconds was a long time in this case. If one will have time to measure traffic in an intersection to be able to take actions in the next intersection, one has not got many seconds time to act. If the the intersections are in the distance of 250–300 m, it will take 15–20 seconds to travel the distance. The time needed for prewarning with "yellow-green" and break from 50 km/h, might be estimated to 5–8 seconds, and the cars need a distance of about 50 m to break to stop. The time period for measuring, calculating, deciding and introducing the action should not exceed 5–10 seconds. By using predictions and choice of actions, which regulate the "tails" of the flows, one can gain a little time. We see however that time periods in the order of 10 seconds might be applicable for real-time systems in the topic application. Larger traffic roads with long distance between nodes might be handled with a bit longer time periods.

For traditional traffic systems 10 seconds periods are very short. A modern data-communication system with direct access to sensors and control means has no problems with the mentioned short time periods. There is by this reason no need for being at the limit of the acceptable periods. If it would be necessary for good operation at any parts of the road network, one might allow sensors to continuously report each individual car, direct at the detection. The vehicle flows in their turns are limited by cars not driving closer than a time gap of some second, why faster measuring and processing periods will not be interesting from this point of view.

The total capacity of the traffic management system for managing traffic at large networks, might be increased by only surveilling coarsly and with longer time intervals, such nodes, intersections, that have large traffic margins. While other areas with requirements for maximum utilized capacity are surveilled and controlled more intensely.

It is also in line with the invention to study, in dynamic situations, when one finds too much traffic going to enter the topic link, if downstream network can handle a certain short term increase. Thereby an upstream limitation of on-flows might be decreased or totally avoided.

The large dynamic flow variations cause problems in the handling of distribution peaks. On the other hand parts of the network downstream or upstream might have a certain extra capacity, exactly because the extra flows are varying. The invention contains methods for analysis and use of that characteristic, i e compensating an extra load at one position by utilising load margins at other positions.

Queues at links cause risks for blockings. On the other hand it might be in favour to utilize the possibility of buffering short term extra loads, in the shape of queues at such links, which have space left for the queues. When the load decreases below the ration value, the queuebuffer might be reduced back. According to the invention this can be made by control of the blocking limit values, and utilizing the existent margins.

Short about Levels 1–3

Level 1 creates rations for the links, which are defined from start. The rations corresponds to the present average traffic need for the time period (the basic need), and provides an effective utilisation of the road network. At level 1 there might be included signs for a certain rerouting of traffic, and buffer zones, already to perform the solution foundation. consisting of the ration assignment.

Level 2 creates corrections of the ration-values, depending on deviations of the present traffic needs from the basic needs according to the level 1. That implies changes of the said traffic management actions according to level 1. There might be included further dynamic information to the travellers, e g by VMS, "Variable Message Sign", positioned at selected road links.

Level 3 contains control actions to maintain the rations according to Level 1 or Level 2. Level 3 is not providing such rigid controls however, that it only "cut off" all deviations, which are larger than the ration. As the flows have large statistical variations, there would be many nodes and linens underutilized. The variations mean that also large decreases of flows arise in the flow distribution.

It is not that easy that one can direct control for a given average of flows to a node. The flows from individual entrances to a node provide various distributions between the exits from the node. Askew distributions thereby cause a large risk for extra load at one of the exit links, and thereby a large risk for blocking effects on that link That will be further discussed in the section below: "Uncertainties and S/N".

Uncertainties and S/N

According to the invention predictions or estimations can be made to obtain estimations on values, which are not yet measured, or to substitute values which are not to be measured or have not been measured. Therefor the road network don't need to be equipped with sensors that measure all the flows and queues on all links, and are measuring everything correctly with short measuring periods, always. According to the invention the system can be equipped with functions, which predict and estimate information that is otherwise missing. That will make the system cheaper, and more robust against arisen failures, e g sensors which cease operating. The system thus doesn't need to cease operating because some piece of information is missing, but can go on operating with solutions that take uncertainties into consideration.

We start with the measurements, the position of the sensors and what they are measuring. a1. By positioning sensors at the entrance of a link, i e most upstream on the link, the measurement here will give exact entrance flow to the link. If one would also from this sensor obtain information, how this flow would be distributed on downstream links, to be able to see if those links obtain too large input flows and to be able to control limitations of those flows, one can act according to (a2) and (a3) below. Predictions of still further downstream a flows are described in (a4).

a2. The sensor is measuring the respective sub-flow: Le, St, Ri, which will be included in the out-flow of the link.

That might be made e g if the subflows are separated on different lanes, or if the cars are signaling e g with their blinkers for Le and Ri. If this is done for all entrance links, their contributions can be put together and give the total input flow of respective downs link. The out-flows can also be controlled by the respective link control means, limiting the in-flows to the respective downstream link to given values. If the control means control per subflow, there is a knowledge about how much of the respective link subflow, which has gone to which link, and how many cars that possibly have to be left behind on the link.

With those described means the system can predict the flows on downstream links. The accuracy of the prediction is not quite exact, not only because a prediction can never be exact, but because one doesn't know how many cars that really are passing during the respective "green-time" (gen. passage information) of the control means. For better accuracy one can measure how many cars that actually passed out from the link, and then preferably per subflow. Still more certain values are obtained by actually measuring the inflow per downstream link, i e positioning the sensors correspondingly to the case in (a) above. The increased certainty from measurements further downstream have been obtained by the cost of time. And time is important to be able to act in time. The measurement at the entrance of the downstream link give the exact measure of the requested input flow. But the measured cars have already passed the control means, and therefore it is too late to prevent possible extra cars. To be able to do this one needs to predict in due time, how many more cars that might pass before the control means get the order to stop the out-flow, i e one cannot control exactly, only measure the deviation exactly from the desired value.

A measurement site one step upstream, at the exit of the entrance link instead, gives less delay for the control information. Also here there is however a need for some prediction, as the first car which can be stopped by the controls, should be a certain distance upstream on the link, to be able to break and stop before the exit of the link.

In the example above good accuracy was obtained. Those measurements traditionally performed in traffic provide much larger uncertainties. Example: If the sensor according to (a1) only measure one of the subflows or only the total, then the uncertainty is still larger about the subflows and thereby about the in-flows to downstream links. We can imagine all possible combinations, where on some links all subflows are measured as above, or on other links where only one and the total of the other two subflows are measured, and further on other links where only the total flow is measured. If those links, where flows are best measured, also have the majority of the flows, and if subflows, which are not measured at all, are relatively small, a good accuracy might still be obtained, compared to the opposite conditions.

Predictions can help decreasing the uncertainty in the example above. At a traditionally light signal controlled intersection, there is a clear time dependent relation between the input flow to a link and the link from which the flow is arriving. That creates a possibility to predict as well from measurements as from the control actions, and also predicting controls from measurements. The invention is including the utilisation of predictions for consideration of the statistical variations. That will be further discussed in (a4) below.

a3. It is also included in the invention to use control methods, which are handling the out-flow in a more accurate way. Example: With at least one lane per subflow at the exit of the link, the subflows are sorted. A sensor e g a videosensor, can "count" cars per subflow lane, and control means can in time inform even which car in the lane, which is permitted to pass during the present "green phase".

The system also can compare corresponding results from the other entrance links, and allow some more cars from a subflow of a link, if there is a shortage in the corresponding subflow of another link. Thereby a somewhat larger capacity might be utilised. In this way there is obtained also both a more exact knowledge and a more exact control of the flows into downstream links.

Instead of the arrangement with lanes per subflow, other arrangements can be used, e g an arrangement with queue-pockets for subflows along the link. That alternative is used to examplify the method in the claims.

a4. From the measurement according to (a1) on link no 1, (a2) and (a3) were treating the downstream link flow. Here we will take a step further and consider links downstream the downstream link. For that purpose the subflows of the downstream link are needed, which still are not measured for those subflows, which are measured on the link according to (a1). The measurement on link no 1 thus will, per subflow, e g for subflow St, contain Le, St and Ri. Those (Le, St, Ri) are subflows on that downstream link, which in-flow consists of the subflow St on link no 1. The distribution of subflows in a subflow can be predicted according to the relations which exist and are described in (a2).

It is also possible to measure subflows of the subflows already on the link no 1. In the arrangement with queue-pockets along a link (a3), the queue-pockets in their turn might be organised with subpockets, which represent the respective subflow of a subflow. The queue-pockets are filled by cars, which are filling the respective subpocket Hereby cars per subpocket can be counted and the control means can limit, in the same way as in (a2), the subflow of the subflow already here on the link no 1. The advantage with this arrangement is that one obtains a good preparation in advance and possibility to take a spectra of actions, if the measurement on link no 1 shows that one of the downstream links of the downstream links will get a too large in-flow. The measured extra flow can be handled wholly or partly with those margins that exist for respective link, e g:

For the link, no 2, where the problem has been predicted: Have that link any margin left, which can be utilised by: Ration margin, Out-flow margin and Buffer margin?

For upstream links of link no 2: Have any of those links a Buffer margin, which can be utilised?

For upstream links of upstream links of link no 2: Have any of those links a Buffer margin, which can be utilised? One of those links are link no 1, which measurement was the foundation for the prediction, which indicated the problem. By buffering an extra flow (e g volume) already here, a future problem might be avoided on a link, two links further downstream.

With prediction, according to the invention, several possibilities can be created to solve a predicted future problem, in such a way that this problem doesn't arise. The number of possible margins are according to the above example, if each node is a four-road intersection: 3+3+3*3=15.

If none of those margins should be available, the knowledge about the future problem anyhow gives a possibility to reduce the out-flow of the upstream links, in such a way that immediately after an extra input flow, the extra flow is compensated by a corresponding smaller flow.

If (in the example above) no prediction would be done, the problem would arise and be detected on the said link no 2, and then the whole road network upstream in two link-steps would be filled with flows of cars on their travel to link no 2. Not until then a compensating smaller flow might be performed. Thereby the risk is increased for causing a blocking, which has got time to grow powerful, and which requires much larger limitations of the traffic to be liquidated.

Prediction Uncertainties

FIG. 1 illustrates a road network including links and nodes. A few sensors, S1–S3, are shown at respective link (R1–R3), which is illustrated with an arrow, and which is positioned upstream respective node, N1–N3. Only those links with traffic flow in the arrow direction are displayed. The sensors feed a traffic management or control system, TMS, with sensor information. The TMS can be a central system or at least partly distributed, and is managing the control means at links or nodes in accordance with the method, e.g. preventing blocking of flows on the road network.

Figure 2:
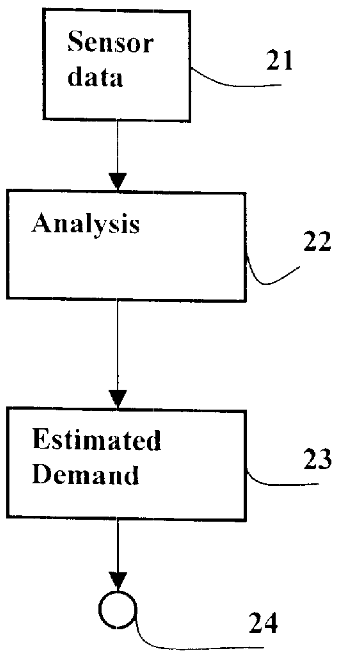
FIG. 2 illustrates flows crossing the node N1.
Figure 3:
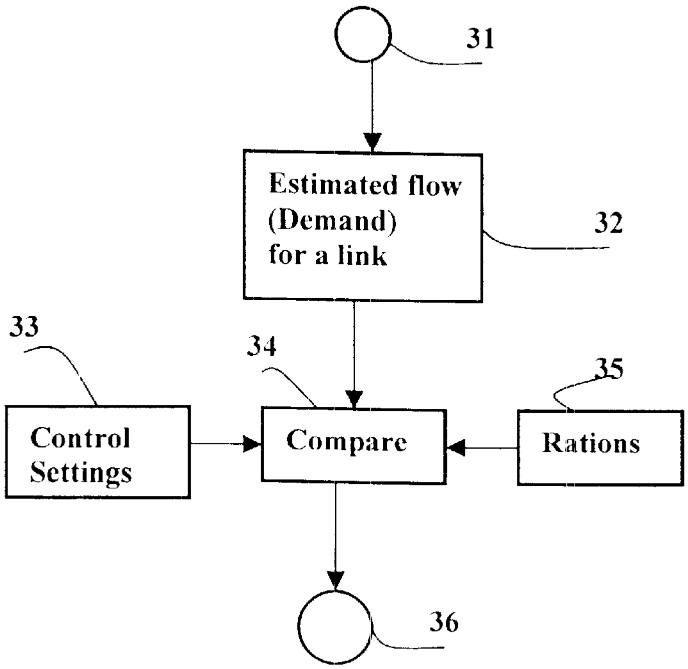
Figure 4:
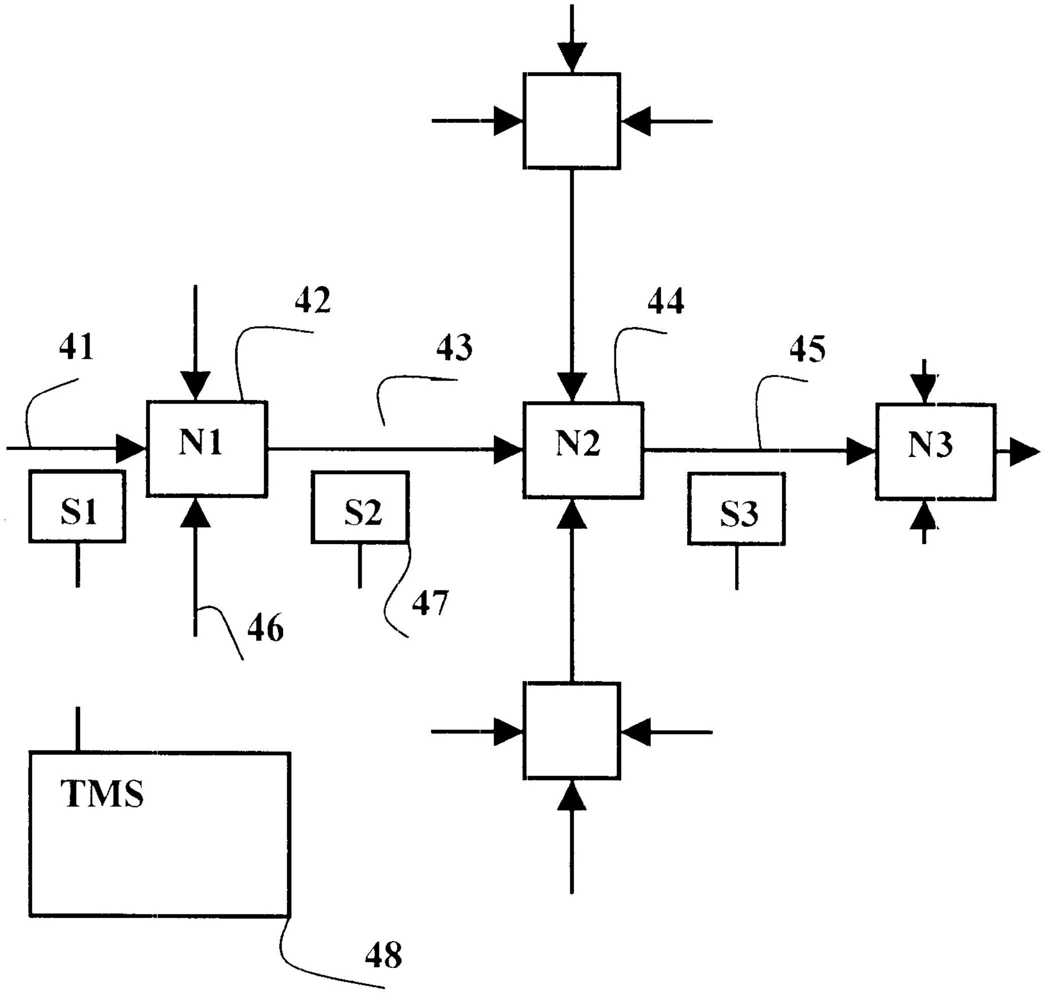
Figure 5:
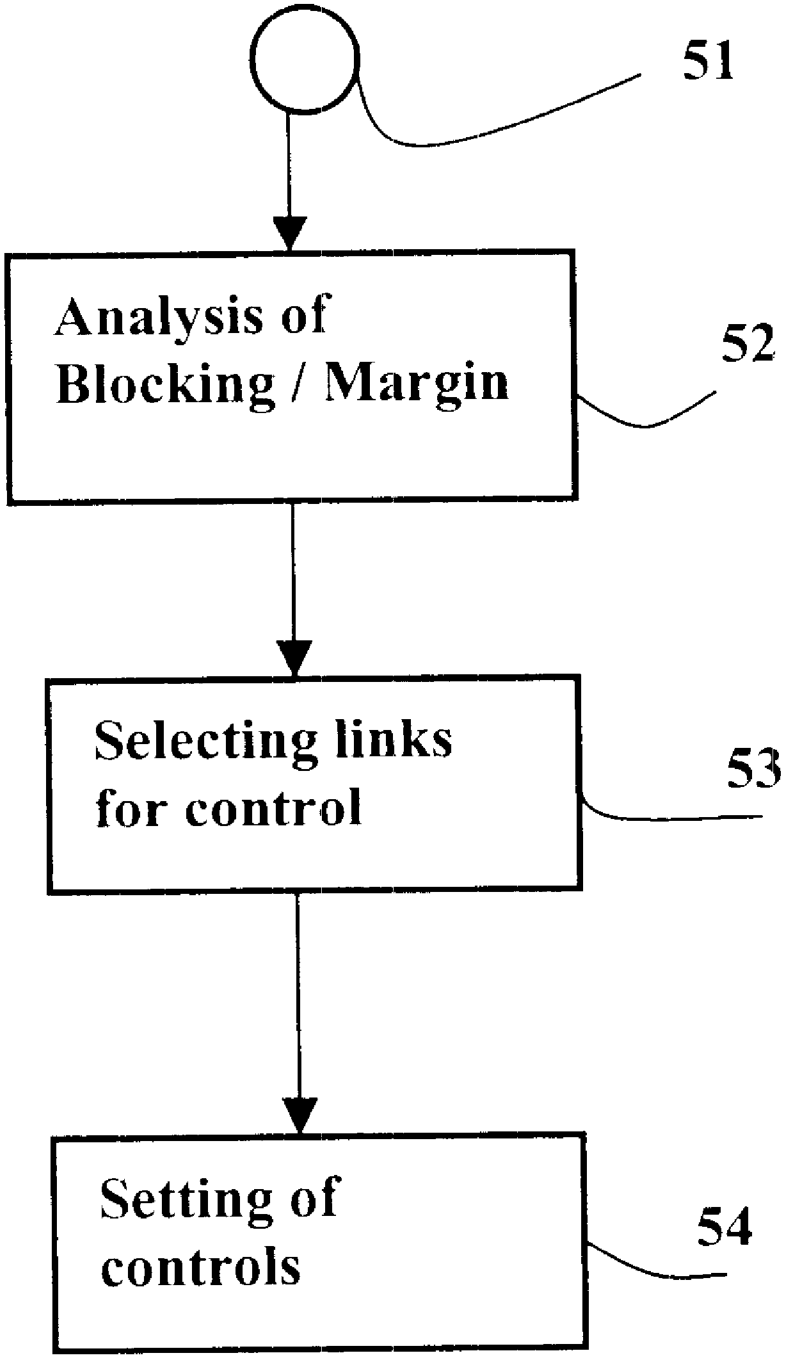
Figure 6:
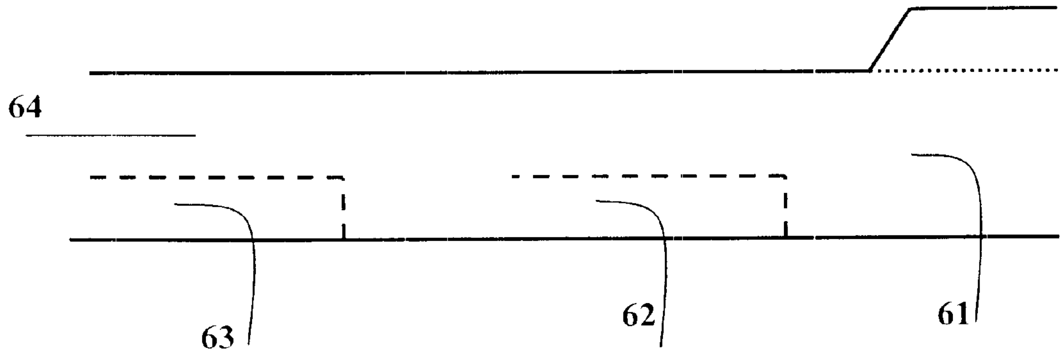
Figure 7:
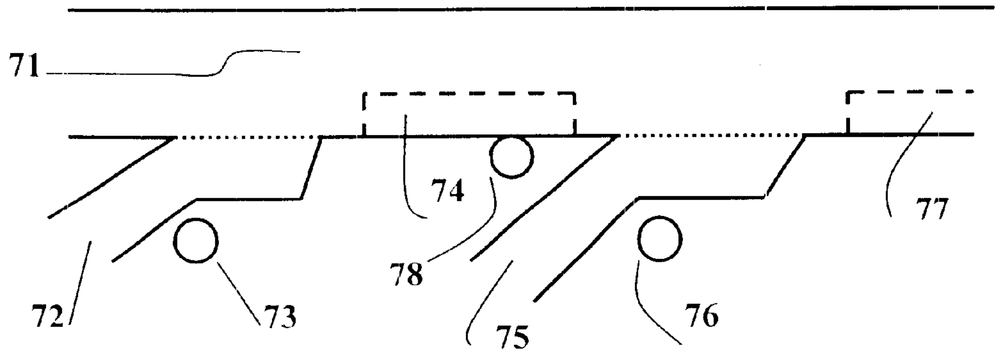
Figure 8:
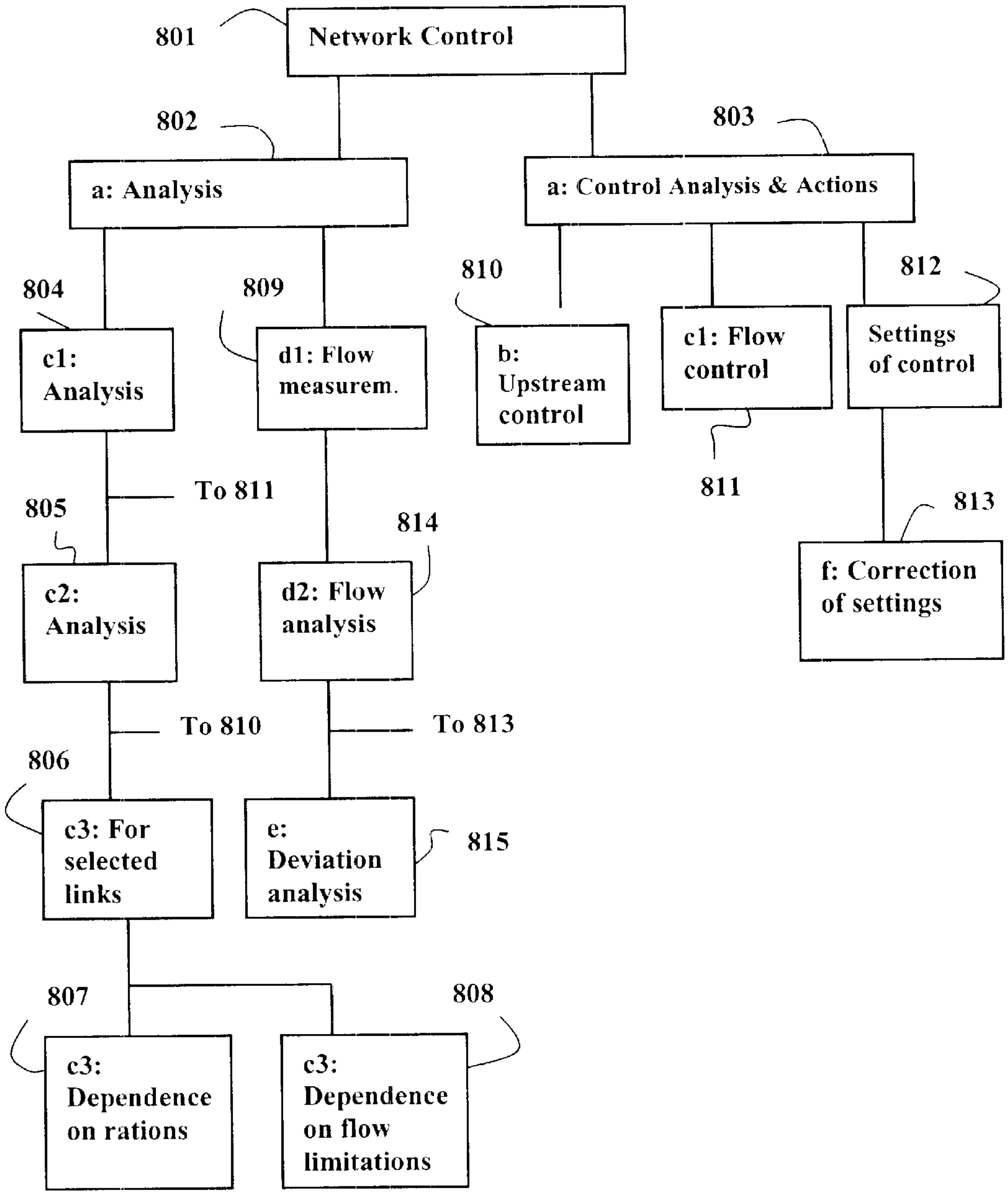
Figure 9:
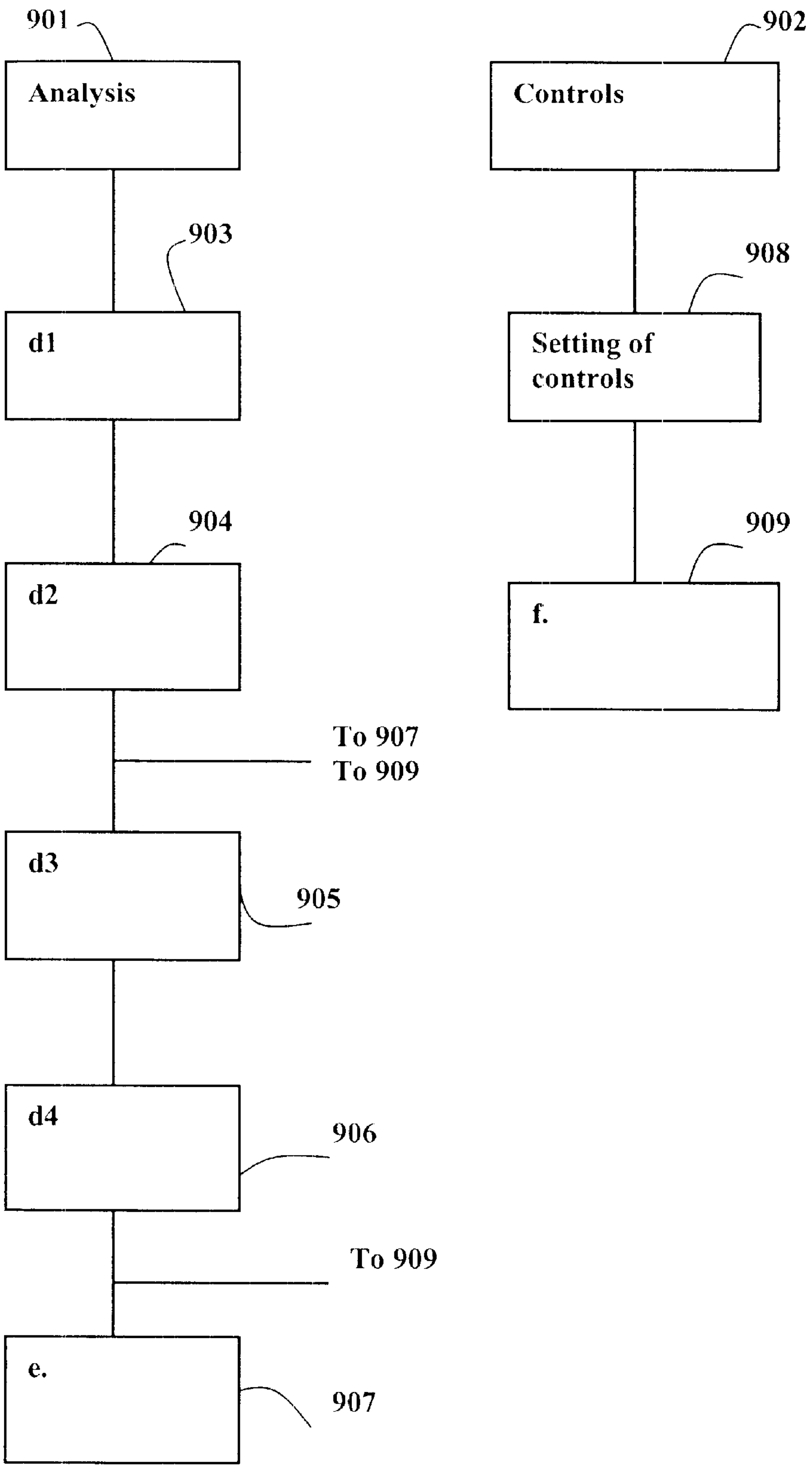
Figure 10:
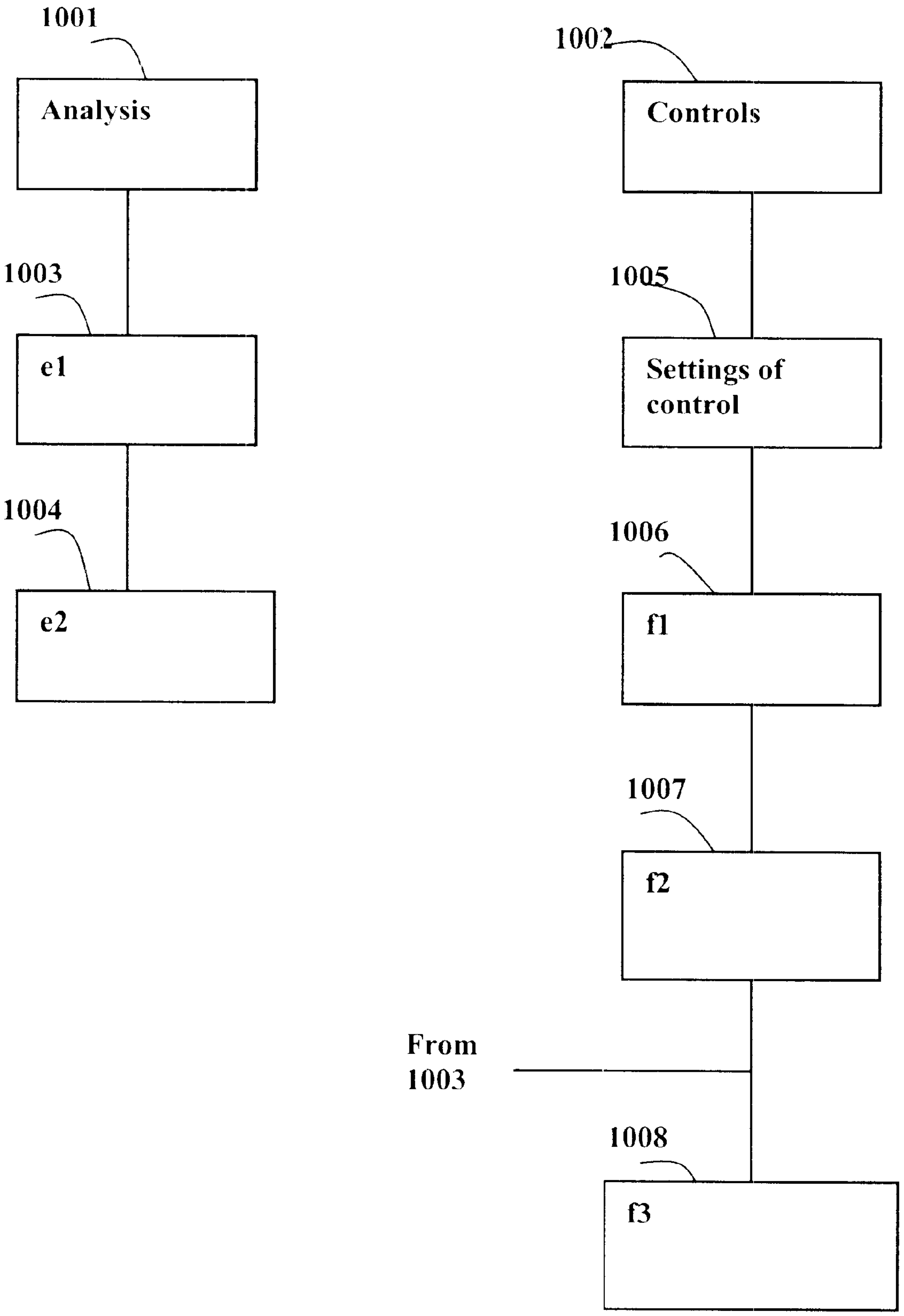
Figure 11:
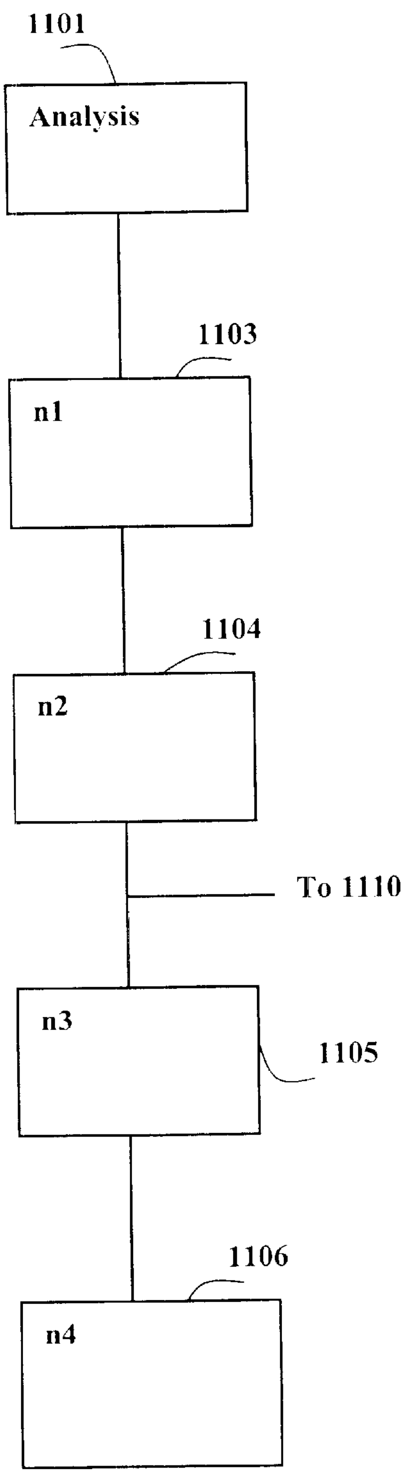
Figure 12:
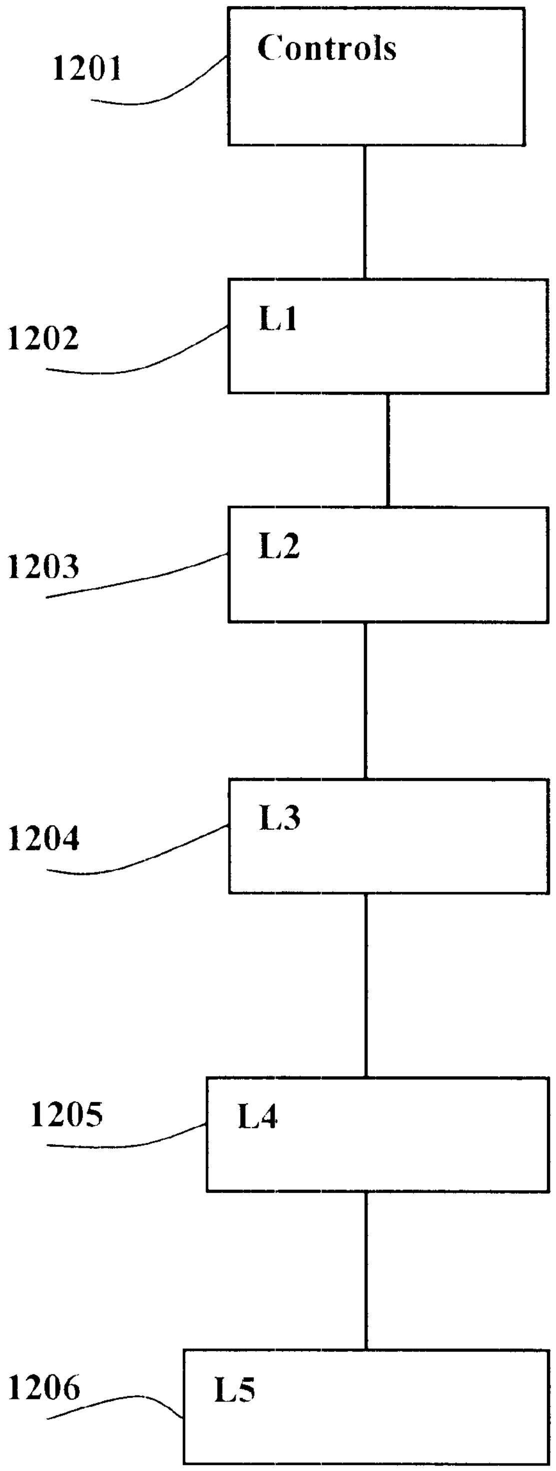

FIG. 2 illustrates that the total flow on link R1 is I(R1) and it is flowing to the single node shown, (N1). Also connected to the node are Links V1 and H1 with respective flow I(V1) and I(H1). Downstream the node, link R2 obtains the flow I(R2) from the subflows I(R1:R) from the link R1, I(V1:V) from the link V1 and I(H1:H) from the link H1. Also shown are the other subflows from link R1, i.e. I(R1:V) to the link V1 and I(R1:H) to the link H1.

Four different prediction cases will be compared below (a, b, c, d). The studied subnetwork consists of a link R1 in its surroundings. Upstream link R1, the link R1 is connected through Node 0 with three entrance links:R0, V0 and H0. Those links have respectively three outgoing subflows, of which subflow R from R0, V from V0, H from H0 are in-flows to link R1. The notation V, R and H are used for respectively Left (Swedish Vänster), Straight ahead (Sw. Rakt fram) and Right (Sw. Höger).

Downstream link R1, R1 is connected through Node 1 with the exit link R2. The other two entrance linksare V1 and H1.

a. The first case starts from a measurement of the total flow on link R1. Then the in-flow is predicted on link R2.

The flow on link R1 is written I(R1). The subflows are I(R1:V), I(R1:R), I(R1:H). Here the subflow I(R1:R) goes straight through Node 1, and becomes in-flow to link R2, i e a part of I(R2). The other subflows go to the respective other exit links. Link R2 is thus also supplied by I(V1:V) and I(H1:H). To show the origin of the flow, it is written e g I(R1,R2), which means the flow from R1 to R2 i e in this case the same flow as I(R1:R).

The averages of flows are Im(R1)=Im(R1:V)+Im(R1:R)+Im(R1:H). Deviations from the averages are written dI(R1)=I(R1)−Im(R1).

With the prediction factor F=F(R1, R1:R) it is obtained the predicted dIp(R1:R)=F*dI(R1).

In the example below normal distributed stochastic variations are assumed. The values obtained are in practice applicable also for other distributions.

With measuring of I(R2) in the corresponding way as I(R1), F can be calculated by known prediction methods {1}. For the moment the uncertainty in F is not considered.

Then the following is obtained:

The noise in the prediction is $N^2=F(1-F)*\sigma^2(I(R1{:}R))$, where $\sigma^2$ is the variance of the said flow.

And the prediction error $e^2=(1-F)*\sigma^2(I(R1{:}R))$, where a "signal error" is included $\sigma^2(s, I)=(1-F)^2*\sigma^2(I(R1{:}R))$.

The prediction error consists of the two mentioned components according to $e^2=\sigma^2(s,)+N^2$.

The Signal/noise ratio $(S/N)^2=Im(R1{:}R)/F(1-F)+F^2/F(1-F)$, where Im is the flow per a given time period, during which the variation values are determined. For the flow according to e g MKSA-units, Im will be replaced by Im*Tp, i e a volume value, where Tp is the mentioned time period.

The Signal/error ratio $(S/e)^2=(S/N)^2*F$.

In a numerical example F=0,5 and Im(R1:R)=30 cars in Tp=30 seconds.

Then $(S/N)^2$=21 dB, and $(S/e)^2$=18 dB.

That S/N can be compared with the corresponding value in the cases (b)–(d) below.

b. If one instead is predicting Ip(R1:R)=Im(R1:R), i e assume that the future value is equal to the average value, it is obtained:

$(S/e)^2$=Im(R1:R), which according to the example in (a) is half as large as $(S/e)^2$ in (a).

c. If one has no method for determining F and the average value of the subflow, but start from the measurements, i e the measured total values on I(R1) and I(R27), the estimation of I(R2) would be worse. If e g one of three subflows is assumed to be ⅓ of the measured flow, it is obtained: $(S/e)^2$=8 dB or 10 times less than $(S/e)^2$ in (a).

d. If one in case (a) uses that one also has measured the flows of the links upstream R1, i e the links V0, R0 and H0, and from here is predicting the subflows on the link R1, there are possibilities to improve the S/N ratios. If the flow I(R0:R) mainly continues straight ahead as I(R1:R), while the other flows give respectively I(R1:H) and I(R1:V), the effective F-value can be increased. With F=0,8 the corresponding $(S/e)^2$=22 dB or 2,5 times the $(S/e)^2$ in (a).

Conclusions of the prediction case above.

In the case above only the contribution from link R1 is predicted, i e I(R1,R2). In the corresponding way the contributions from the links V1 and H1 can be predicted. Together there is obtained a prediction of the whole flow I(R2) on link R2. If the contribution from V1 and H1 provide 40% of the total flow I(R2), and they are predicted with the same accuracy as obtained in (a), it is obtained for the prediction of the whole I(R2): $(S/e)^2$=20 dB or 1,7 times the $(S/e)^2$ in (a). The increase of S/N is depending on noise being added uncorrelated, while signal is added correlated.

If however the contributions from V1 and H1 had been more noisy than the contribution from R1, $(S/e)^2$ could have been smaller. That is valid also for S/N, if S/N is not optimised by weighted addition.

The above example shows large differences in accuracy depending on the prediction method The numerical examples show the order of 90% accuracy. $(S/N)^2$ increases proportionally with the number of time periods, why the accumulated accuracy increases.

The above predictions were made from measurements of the total flow in the measurement point. If instead the respective subflow on the link was measured, still better prerequisites are obtained for an accurate prediction of downstream link flow. That has been treated in the above sections, points (a1)–(a4).

The predictions are needed to create time margins, and thereby making possible implementations of actions in time to prevent undesired traffic problems. Predictions can be made better if the measurement foundation is good. But predictions can also be used to help from shortages in the measurement basis. Thus the predictions also have a function of performing an available, robust system to a lower cost The predictions are used interactively with the traffic control. The predictions create prerequisites for an effective traffic control. At the same time a defined control of e g the out-flow from a link is providing good prerequisites for prediction of the downstream flow. If the out-flow would need limitation to a given value, the control means could be designed to count and let through cars according to this value. Then the downstream flows can be predicted with a good accuracy to a known control value. That is utilised in the invention.

Also when predictions and controls according to the above, are creating good accuracy when managing traffic it is valuable if the system contains margins to handle variations and deviations from the present prerequisites. That will be treated in the section about margins below.

Margins

With large margins the requirements on prediction accuracy are reduced. It can be expressed in such a way that requirements on short term accuracy can be exchanged to requirements concerning longer time periods. One example is buffer margins, where short term variations are buffered as queues, with control of the queue being within given limits. Margins can often be created at the expense of efficiency. An example is setting a ration for the flow on a link, at a smaller value than the link can handle. Then the link can handle variations above the ration, at the expense of a corresponding smaller average flow.

In the invention it is included to handle margins and requirements on the operational function. The following example is illustrating the problem and the solution. The system gets a requirement on no more than one blocking per day in a road subnetwork consisting of 50 links. The difficult time period is the rush time period during two hours in the morning. The time periods which will be handled are determined by external prerequisites, e g the length of the green periods at a light signal controlled intersection. It is also depending on the design of links and the lane structure. Here the time period of 10 seconds is chosen.

The number of cases treated per day is estimated to about $50*2*60*6=0,36*10^5$ i e an acceptable false alarm risk is $10^{-5}$. In a noisy system the margin between the signal and the threshold (the ration) needs to be that large that rare large noise peaks don't exceed the threshold. For normal distributed noise, that condition corresponds to a noise peak of about $4*\sigma$, i e 4 times larger than the standard deviation of the noise.

At estimating probabilities of large noisepeaks the distribution functions can be adapted to the real traffic variations that are measured. An approximation is the distribution: $P(y>x)=0,5*\exp-(x/1.2\sigma)^2$, where $P(y>x)$ means the probability that y is larger than x.

If the probability shall be $10^{-5}$ then $x/\sigma$ can be calculated from: $x/\sigma=(-1.44*\text{InP}-1)^{0,5}$.

If $\sigma$ is 10% of the signal, the margin would need to be 40% of the signal. A margin of 40% might be large and give rise to other problems, depending on how it would be implemented. If the signal value of the flow on a link has to be limited to 70% of the allowed max-value, the utilised capacity in the system would be small.

At the discussion above about prediction accuracy, 20 dB was an example of good values. It means that bad prediction methods give rise to still much larger margin needs.

In accordance with the invention, margins are created and used in a bit different way. In the short time periods which were chosen above, 10 seconds, the total variations will not be very large. If a predicted subflow is 10 cars in 10 seconds, which is a large figure, and the mentioned 40% are increased to 60%, there will be a total of 6 cars. It means that the margin don't need to be larger than 6 cars to handle a rare noisepeak in the flow. If a link has space for buffering a queue of 6 extra cars, that might be a suitable margin to utilise.

Another margin can be obtained, when the flows from two other links are added to a first link flow, to give the total input flow of a link. The two other flows might not totally fill their respective rations, why the overloaded first link might let through 1–6 of the extra cars. Also the downstream link might have an unutilised buffer margin, which can handle the whole or a part of the extra flow.

For system with cycle time periods of 30 seconds, with the above 40% noise and a subflow of 30 cars, the margin number of cars is 12. It would be interesting if those cars might be buffered in a queue on the link for a short time period. The buffer margin, which can be used for intermittent queueing cars, is an interesting type of margin. The condition connected to the buffer queue is that the queue is arranged in such a way that it doesn't block the flow on the link. More about that in the next section.

In the invention methods are included for limiting the flow, which can reduce the size of the noisepeaks. In the section above "Prediction uncertainties" at point (d), $(S/e)^2$ is larger when the flow I(R1) is limited to a given value by the control means, and the effective F-value is above 0,5. Then it is obtained:

$$(S/e)^2=Im(R1:R)*F/(1-F)^2+F^2/(1-F),$$

and with inserted numerical values $(S/e)^2=28$ dB, which is 10 times larger than $(S/e)^2$ in the point (a).

Hereby the $\sigma$-value of the noise would be 4% of the signal, and the corresponding margin wouldn't be more than 16%. In the example above, then the respective margin would decrease to a number of cars equal to 3 and 5 respectively.

Buffer Margins

The flow that can pass a given route, is limited to the maximum flow through the most narrow section on the route. If the nodes are the narrow sections, the limit is set by the node that offer the lowest capacity. If the links and nodes of the route are equal at other conditions, the node with the largest crossing flow would be the node with the lowest capacity in the route direction. That implies that it might be unsuitable to collect traffic for a few crossing routes. If traffic instead is spread over several routes, each one would get a small flow through the nodes and the given route can be given a larger capacity in its nodes.

That is valid as long as the nodes are that far from each other, that a downstream node is not influencing the flow through the upstream node. The distance shouldn't be that short between the nodes, that the first cars passing the first node during a green phase, are reaching the next node and are growing a queue, which is growing upstream and prevent the last cars passing the node during the green phase. The link between the nodes would be blocked, and the integrated capacity of the nodes decreases.

The two crossing flows in the two nodes give an adding effect, which turns to the same result as in the case with one node, when the distance between the nodes decreases to zero. The capacity through two close nodes might be increased by synchronizing the nodes.

Queues on links cause similar blocking effects as if the distance between the nodes is shrinking. When the queue has grown to the upstream node, the link is totally blocked. The blocking problems however might start long before. It depends on the design of the link. Example:

a. A first link has got two lanes, the left for left-turning R1:V, and straight ahead R1:R, the right one for right-turning R1:H and straight ahead R1:R. Control means trying to control the out-flow per direction V, R, H, then always get problem with blockings. Independent of green direction, there will always be another car first in the lane, that is waiting for the green light for its selected direction. The cars are unsorted per direction, and are queueing in both of the lanes.

b. In contrast to (a) this link has got at least one lane per direction, why each direction is queueing in its lane and the cars are not blocking each other at the green phases per direction.

c. There is also an intermediate situation between (a) and (b), where the link exit area is equipped with a short extra separate V-lane and/or H-lane. A corresponding buffer queue, might be handled dependent on the length of the extra separate lanes. When those lanes have been filled up with queues, a similar situation as in (a) arises.

d. For links, which aren't wide enough for containing separate lanes per direction, an alternative might be:

d1. Saving an "outflow-zone" or "exit zone" on a smaller stretch of the link. Here only cars are allowed that are leaving the link during the present green phase. And possible after those cars, other cars waiting for the next green phase.

d2. The rest of the queueing cars start queueing behind (upstream) the outflow-zone, and are positioned along the link in e g a single "queue-lane", (if the link has got two lanes), and are leaving the other lane free for travel ahead to the outflow-zone. The control means can count the cars, with the direction, which is the topic one for passage at the next green phase. Those cars can turn into the free lane, and utilise both the lanes in the outflow-zone. That makes possible a large capacity during the node passage. In (a3) and (a4) in section: "Uncertainties . . . " above, also other alternatives were described with separate queue-pockets per direction. This design (d) can create longer Buffer margins, where the whole link can be utilised, in contrast to the examples (a) and (c).

e. The design in (d) can be expanded and also be used for still more detailed control. Control of subflows of the subflows can be performed already here. E g the flow I(R1:R) going for R2, can be controlled separately in I(R1:R:R) separate from I(R1:R:V) etc. Thereby I(R2:R) can be limited by the control means already at link R1, and be separately limited from I(R1:R:V) etc.

The presentation means might e g be designed to show with a green arrow which subflow on R1 having green. Green for a subflow of a subflow, might e g be marked with two arrows, showing the respective direction.

f. The system in (e) can be expanded further. It is imaginable to present a small "close area map" of the closest downsteam network, and on that map e g with different colours mark links with limited in-flows, queues etc. It might be a close area map per subflow. Links totally blocked might be indicated with a red X. Thereby car drivers get the opportunity to choose alternative roads at an early upstream stage, and the traffic might be better spread out. The control means can also already here decrease the subflows and the subflows of the subflows for the topic direction, by e g marking green for the alternative route on the said "close area map". Hereby a spread of traffic can be more or less forced into realisation far upstream the problem area.

High Level Network Analysis

The system can surveil the traffic on the road network in several ways. A way is by analysis of the network load, e g all the links with limited in-flows might be detected and studied Hereby one can see certain problem areas e g areas around an incident, and how far upstream the effects have been spread. The system can identify parallal "less loaded" links and manage transfer of traffic to such links.

At rush hours the problem might appear that several parallal links are limited in the same major direction, (into the city-kerrnal). At deviations from the normal state, there might be reasons for changing the ration-plan, and adapt to the new situation. E g the major direction might be given more capacity in the nodes with the start downstream. The crossing flows then get less passability. That action can be complemented by actions far upstream.

The information about increased traffic problems can be parallalled with actions for spreading traffic early upstream. E g by requests to select early upstream crossconnections to find a suitable entrance road, that is heading more directly to the target. The concept is similar to what one wants to reach with ring-roads, i e utilising the ring-road for transport to a suitable entrance road, and avoiding crossroads closer to the city where traffic and intersections cause larger problems.

The invention is based on solutions at several levels. The upper level with rations is important, as it is creating prerequisites to provide, with smaller corrections, an efficient traffic passage through the road network. Also at this level corrections are needed and updates adapted to changes in the network and the traffic situation.

Capacity and Travel Time

In the above sections mainly the network capacity has been discussed, and its dependence of blocking of flows. That effort is a cause for queues and longer travel times. If the capacity of a route can be kept at a level C1, with the help of the methods of the invention, when blocking otherwise would have caused the capacity C2, there is a flow difference C1–C2, which gives queue growth. That queue growth can continue for 1–2 hours rush traffic, block several links and grow new queues. That means that the difference in travel time for a "non-blocked" road network, compared to a blocked one, can be substantial.

Travel time through a street network might be long also if the traffic flows are below the capacity level. If the nodes are signal controlled and cars are arriving stochastically to the nodes, they have to wait in the order of half a time plan cycle, e g 50 seconds per node. With 12 nodes that implies 10 minutes extra above the driving time. If there are queues, which haven't got time to pass during the green time, there would very easy be one more cycle time period, and the 10 minutes extra might easily be half an hour or more. Travel times might be remnarkable also when blocking is not arising. Therefore it is no intrinsic value providing queue buffers in the network. According to the invention there is a desire to keep queues small on the links, partly because the buffer margins then are kept free until they are needed to handle the intermittent extra flows, partly for not providing unnecessarily long travel times.

What is claimed is:

1. A method for managing traffic in a road network, comprising:

a selection of different roads selected from the group consisting of at least one of motorways, larger roads, a thoroughfare, entrance roads, and subareas of the network, wherein subnetworks in city areas include road network of streets with crossings, and where the network includes road links which are connected with each other via nodes, wherein said nodes can connect a variable number of links, and be designed in different ways, wherein said roundabouts are included and various types of intersections; and wherein sensors and control means for traffic are positioned at selected links in the network, and wherein the traffic management includes a task to preserve and utilize a large capacity on selected parts of the road network, wherein capacity at a selected cross section includes the maximum traffic flow which can pass the cross section, and including performing said task during a time period when the traffic volume and need for capacity are large, and wherein the method for traffic management is based on selected basic principles, and is characterized by;

a. reducing blocking and risk for blocking of flows on links, whereby blocking is meant cars that standing still or with low velocity wholly or partly are blocking one or several lanes for in-flows or passing through flows on a link;

b. performing step (a) by limiting the upstream flow to reduce the risk for blocking downstream link;

c1. performing step (a) by determining flow rations for selected parts of the network, and the ration being a target value at the control of the size of a flow to a link or a node;

c2. performing step (c1) with application of step (b), where the ration for a link is determined, including a judgment of the risk for blocking of said link;

c3. performing step (c2) for selected links in addition of determining the ration for a link, where also the risk for blocking downstream link is judged at the ration determination, and is based on the ration for in-flows to a link being governed by the out-flow from the link, and is the out-flow from the link via downstream node dependent on rations, which are given to exit links from said downstream node, and dependent on limitation, which are given by controlling flows through the node from entrance links of the node to exit links of the node;

d1. for a node with at least one upstream link performing step (a) by measuring flows on at least one of this link, other upstream links and downstream links;

d2. measurements according to step (d1) being used for the method step of comparing estimated flow values, based on said measurements, with at least one of: assigned rations and settings of control for controlling the out-flow from at least one of upstream links of said node, and when deviations are larger than selected values, performing actions according to at least one of steps (e)–(f) as follows;

e. analyzing if said deviaton according to step (d2), indicates that at least one of said links are or will be blocked or has a margin to handle said deviation; and f. assigning corrected settings of the control selecting at least one of: said links and their upstream links.

2. A method according to claim 1, characterized by:

d1. for a node with at least three links, performing the step of measuring distributed flows (subflows) on at least one of those links regarding flows upstream the node for at least two of: turn left V, turn right H, continue straight ahead R, and a combination of two of those in said node;

d2. using measurements step (d1) for comparing the measured flows with the settings of the control for controlling out-flows from the link, and when the deviation is larger than a selected value, performing actions according to at least one of steps (e)–(f) as follows;

d3. using measurements according to step (d1) for determining input flows to at least one of the links downstream said node;

d4. according to step (d3), comparing estimated sizes of input flows on a link with the ration for the link, and if the deviation is larger than a selected value, performing actions according to at least one of steps (e)–(f) as follows;

e. analyzing if said deviation according to steps (d2) and (d4) respectively, indicates that at least one of said links are blocked or has a margin to handle said deviation;

f. assigning control for correcting the setting on at least one link of said links and the upstream links.

3. A method according to claim 1, characterized by;

k1. for a node with at least three input and three output links, including a four road crossing with four entrance and four exit links, performing the method step of measuring distributed flows on at least one of those entrance links regarding the flows upstream the node for at least two of: turn left V, turn right H, continue straight ahead R, in said node;

k2. using measurements according to step (k1) for the step of comparing the measured flows with the settings of the control for controlling out-flows from the link, and when the deviation is larger than a selected value, performing actions according to at least one of steps (e)–(f) as follows;

k3. using measurements according to step (k1) for determining input flows to at least one of the exit links downstream said node, and thereby adding together flows from different entrance links based on said measurements;

k4. according to step (k3), comparing estimated sizes of input flows on a link with the ration for the link, and if the deviation is larger than a selected value, performing actions according to at least one of steps (e)–(f) as follows;

e. analyzing if said deviation according to steps (k2) and (k4) respectively, indicates that at least one of said links are blocked or has a margin to handle said deviation;

f. assigning control setting on at least one link of said links and the upstream links.

4. A method according to claim 1, characterized by;

e1. performing the step of determining at least one margin for a link to handle a time limited large flow without blocking the link, and where a margin is related to at least one of steps (e2)–(f3) as follows;

e2. prerequisites on the link and the surrounding road network, including prerequisites on a margin, being composed of allowed buffer queue size on at least one of: on a selected lane of said link and totally on the link;

f1. performing the step of dynamically setting control for controlling out-flows from a link;

f2. assigning, control according to step (f1), a ration-setting, which corresponds to ration-values of the link;

f3. assigning a corrected setting, to control according to step (f1) and considering margins according to step (e1), when deviations from the ration-setting are required on at least one link of: said link and upstream links.

5. A method according to claim 1, characterized by;

n1. for a motorway node being an entrance node, performing the step of measuring upstream flows on the motorway and the entrance road;

n2. from measurements according to step (n1), predicting entering flow to a downstream entrance node, and comparing that flow with the corresponding ration, and if the difference is larger than a selected value, perform actions according to step (n7);

n3. performing the step of determining margins for a motorway link to handle large flows without the link being blocked;

n4. a margin according to step (n3), said margin including the allowed size of the buffer queue on a motorway link according to at least one of on a selected lane of the link and totally on the link;

n5. performing the step of dynamically setting of control for controlling out-flows from a link;

n6. assigning, to control according to step (n5), a ration-setting, which corresponds to ration-values of motorway links connected to the node;

n7. assigning a corrected setting according to step (n5), to control according to step (n5) and selectively considering step (n3), on at least one of: said downstream entrance and its upstream entrances.

6. A method according to claim 5, characterized by, the entrances of the motorway being connected to a road network, and that the entrance flow controls are fed back upstream along the road network for further traffic control at said network.

7. A method according to claim 5, characterized by; a buffer queue on a motorway exit road having a margin determined by at least one of the following:

a. the queue is not growing upstream on to the motorway and blocking passing flows there;

b. when the passing flows can be limited to fewer lanes, the queue margin can be increased to a queue length reaching up to the motorway and to the next exit, loading one lane, usually the right one, c. the queue on the motorway is not growing past the exit node, such that cars aiming for the exit, will be blocked by the motorway queue;

d. the queue on the motorway is arranged to pass the exit on the motorway, leaving on the closest lane, usually the right one, at least one gap free at or upstream the node, such that upstream cars, which are to turn to the exit, wouldn't be blocked by said motorway queue, and that the margin in this way can be expanded until other conditions are limiting the queue-length.

8. A method according claim 1, characterized by;

L1. at least one lane of a link being appointed as a "queue lane", that cars, which are going to queue, join a queue in this lane, and that at least one of the lanes is appointed being free from parallel queues;

L2. the "queue lane" queue starting upstream an exit zone, which is occupying the space closest to the link exit to the node, and that the exit zone is reserved for cars which are to pass out from the link during the current controlled passage phase, otherwise called a "green phase";

L3. selectively, allowing also cars waiting for the next queue-phase, to join after those cars mentioned in step (L2);

L4. control showing those cars that will pass out in the synchronized "green phase" their travel on the queue-free lane into the exit zone;

L5. the exit zone being designed in that way that at least one lane can be used by exiting cars.

9. A method according to claim 1, characterized by;

L1. equipping a link with at least two queue-pockets along at least one of the lanes, here exemplified with the right one, and where said queue-pockets are representing the out-flows of the link in this example three flows: V, R, H, in an order, in which the respective outflow is controlled by the help of the green phases of the control, whereby green phase is meant letting through of traffic, and where phase (0) is the current or the closest to begin green phase for at least one of V, R, H, and the first queue-pocket is for phase (1), which is the next green phase for the direction in order and phase (2) is after that the next following, and selectively there may also be one queue-pocket for phase (0);

L2. arriving cars to the link, according to given information, are driving into their respective queue-pocket, dependent on which direction: V, R or H, the car will select in the downstream node, and the queue-pockets respective the current phase (0) are filled successively until the respective green period-volume or pocket is full, and after a full phase (0) said possibly selected queue-pocket: phase (0) is filled, while cars representing phases with full queue-pockets or full green period volumes are queuing behind in the order of arrival; and as time is passing and the green phases change, the queue-pocket for phase (1) is being emptied and filled by the cars behind from the queue-pocket for phase (2), which now turns to a new phase (1) in the queue-pocket (1); and to the extent a queue-pocket will be filled with more cars, it will be filled from behind by arriving cars to the link, or from a possible queue behind the queue-pockets;

L3. keeping the lane next to the queue-pockets open for the transports to the respective queue-pocket, L4. using also the adjacent lane for the out-flow from queue-pocket (1) downstream, whereby at least two lanes can be used for the respective green phase direction, and a large out-flow from the link can be provided during a selected time period;

L5. obtaining information by use of sensors about the volume in the queue-pockets and a possible queue behind the queue-pockets, and that presentation means control the queue-pocket allocation and the out-flows from the link;

L6. using information about said volumes to determine input flows to at least one of the exit links downstream said node.

10. A method according to claim 9, characterized by;

M1. dividing the respective queue-pocket in at least two subpockets representing the output flows of a downstream link, here exemplified with three flows: V, R, H in upstream order;

M2. arriving cars to the link, according to given information are driving into their respective subpocket of the queue-pocket dependent on which direction: V, R or H, which the car will select in the node of said downstream link;

M3. hereby basing the flow to a link of the downstream node on ordered packets of cars, subpocket for subpocket from link after link, and thereby providing a presorting per queue-pocket on said downstream link and also a presorting in the possible queue, which might be formed upstream the queue-pockets of the link;

M4. selectively, at the out-flow from queue-pocket (1), distributing subpockets on lanes adapted to the phases of the downstream link, such that the subpocket corresponding to that green phase of the downstream link, which is the phase after the travel time, usually its phase (0), obtains allowance to the adjacent lane or exit;

M5. a subpocket on a first link containing information about future input flows to a second link, which is a downstream link of a downstream link of the first link, and there can be identified several equivalent links to said first link, as being upstream links of upstream links of said second link and selectively predicting said input flows from said information per respective subpocket on the first link and selected equivalent links of this first link.

11. A method according to claim 9, characterized by;

the margin being composed by a buffer queue on the motorway link downstream an exit node, and that the margin is determined by at least one of the following conditions:

a. the queue on the motorway is not growing past the exit node, such that cars aiming for the exit, will be blocked by the motorway queue;

b. the queue on the motorway is arranged to pass the exit on the motorway, leaving on the closest lane, usually the right one, at least one gap free at or upstream the node, such that upstream cars, which are to turn to the exit, wouldn't be blocked by said motorway queue, and that the margin in this way can be expanded until other conditions are limiting the queue-length.

12. A method according to claim 1, characterized by;

L1. performing control of out-flow from a first link regarding the subflows of the link, which subflows are based on the out-flow directions of the link;

L2. dividing said subflows in subsubflows, which regard subflows of downstream links, and controlling out-flow from the first link by including control of at least one of said subsubflows.

13. A method according to claim 1, characterized by;

L1. further developing the steps, concerning control of flow on a first link to at least one second link, which is a link at least one link downstream downstream link of the first link;

L2: control for controlling the marking of selected links on a simple presentation model of the topic downstream road network, and with selected information indicating at least one of:

passage allowance for cars to at least one selected link;

passability problem on at least one selected link.

14. A method according to claim 1, characterized by;

a. a link or node obtaining reduced capacity caused by incidents or other blockings which reduce the flow more than the respective ration, said link respective of the upstream links of said node then are given dynamically corrected rations, related to the limited capacity;

b. changes of rations according to step (a), being fed back at least one step upstream, to selected second links upstream said links in step (a), and if the result is differing more than a selected value from the rations of said second links, those links are given dynamically corrected rations;

c. selectively, changing of rations according to step (a), being fed back at least one step downstream, to selected third links downstream said links to step (a), and if the result is differing more than a selected value from the rations of said third links, those links are given dynamically corrected rations.

15. A method according to claim 1, characterized by;

a. at traffic management with flow distribution on links according to given ratios, leaving information to car drivers about route selection, and thereby decreasing or increasing flows on selected downstream links, to prevent exceeding respectively to utilise the rations of said links;

b. performing step (a) with dynamic information, when the traffic management operates according to dynamically corrected rations.

16. A method according to claim 1, characterized by;

a1. analyzing a margin for a link, considering extra in-flow above the ration, which might be allowed regarding the link out-flow;

a2. analyzing if any flow above the link ration can be let out from the link, including at least one of the following:

b1. analyzing a margin for a link, considering extra out-flow above the ration, which might be allowed regarding other links out-flows to the node and the limited capacity of the node;

b2. analyzing a margin for at least one downstream link, considering extra in-flow above the ration;

b3. analyzing a margin regarding buffer queue for at least one downstream limit.

17. A method according to claim 1, characterized by;

predicting the input flow to a first link from measurements on other selected links, which are upstream links of upstream links to said first link;

a. comparing said predicted flow with the ration for said first link, and if the deviation is larger than a selected value, analyzing and performing at least one action on selected upstream links up to and including said other links;

b. selecting said action from the group:

utilizing a link margin, including queue buffering;

reducing a link out-flow;

feeding back an action on a link for analysis of possible action on at least one upstream link.

18. A method according to claim 1, characterised by;

performing selected actions on selected links in the road network and selecting the actions from a group including the following:

utilizing a link margin, including queue buffering;

reducing a link out-flow;

feeding back an action on a link for analysis of possible action on at least one upstream link;

information to car drivers regarding choice of route.

19. A method according to claim 1, characterized by;

at least one entrance link to a first node in a subnetwork, being assigned at least one of the following:

a. a dynamic ration correction;

b. a control means, which limits the out-flow from the link;

and where the ration correction respective the out-flow limitation is carried out on purpose to decrease blockings in the subnetwork and the respective size is determined based on selected criterias at analysis of results from at least one of steps (c)–(d) as follows:

c. estimation of the deviation between in-flow and out-flow of the subnetwork;

d. estimation of the total or relative traffic volume in the subnetwork.

20. A method according to claim 1, characterized by;

a. performing ration determination and ration correction with steps, where links with limited in-flows are detected and studied;

b. identifying main directions for large limited flows and performing at least one of steps (c)–(e) as follows;

c. when at least one of parallel links have space for more flows up to the ration level, performing control of flow from at least one of said limited links to said link at a position upstream said link;

d. when several parallel links have said limitation, performing analysis of the increase of flow passage on at least one of said links, in said main direction through nodes, with start downstream, and when the ration can be increased, the analysis continues upstream against the main direction, to successively upstream positioned nodes and links, for possible increase of rations in the main direction;

e. increasing rations in the main direction, requiring a decrease of rations in the cross direction through common nodes, and parts of the need of cross flows further upstream in the road network are controlled by actions, according to the step, that car drivers early upstream are managed to search cross connection for such a route in the road network, that in its main direction is heading more direct to the destination;

f. concentrated problems at subnetworks with larger traffic demand than capacity, including incident problems, analyzing the upstream possibilities to manage traffic to less utilized links around the problem area, and in the control actions there is included a setting of dynamically changed ration values at traffic changes including incidents.

21. A method for managing traffic in a road network, comprising:

a selection of different roads selected from the group consisting of at least one of motorways, larger roads, a thoroughfare, an entrance road, subareas of the network, wherein subnetworks in city areas include road network of streets with crossings, and wherein the network (includes road links connected with each other via nodes, wherein said nodes can connect a variable number of links, and be designed in different ways, wherein roundabouts are included and various types of intersections;

wherein sensors and control means for traffic are positioned at selected links in the network, and wherein the traffic management includes a task to preserve and utilize a large capacity on selected parts of the road network, wherein capacity at a selected cross section includes the maximum traffic flow which can pass the cross section, and including performing said task during a time period when the traffic volume and need for capacity are large, and wherein the method for traffic management is based on selected basic principles, and is characterized by;

a. reducing blocking and risk for blocking of flows on links, whereby blocking is meant cars that standing still or with low velocity wholly or partly are blocking one or several lanes for in-flows or passing through flows on a link;

b. performing step (a) by limiting the upstream flow to reduce the risk for blocking downstream link;

c1. performing step (a) by determining flow rations for selected parts of the network, and the ration being a target value at the control of the size of a flow to a link or a node;

d1. at least one area being arranged as queue buffer with connection to said link, that cars can be controlled to join any queue in this queue buffer, and that at least one stretch of a lane parallel to said queue buffer is determined to be free from queues;

d2. arranging the queue buffer upstream an exit zone, which is occupying the space closest to the link exit to the node, and that the next zone is reserved for cars which are to pass out from the link during the next beginning or already currently controlled passage phase, called a "green phase";

d3. selectively, also allowing cars waiting for the next queue-phase, to join after those cars mentioned in step (d2);

d4. control for showing those cars that will pass out in the synchronized "green phase", their travel on the queue-fee lane into the next zone;

d5. the exit zone being designed in that way that at least one lane can be used by exiting cars.

22. A method according to claim 21, characterized by; controlling out-flow from the link regarding a passage phase for left turning (V) and further at least one passage phase for straight ahead (R) and right turning (H), and that V-cars are queueing in said queue buffer waiting for control for connecting to said exit zone, thereby preventing that V-cars are blocking R or H-cars in the exit zone during the passage phase of those cars, and controlling V-cars out from the queue buffer in a controlled number, matched in time for not being blocked by R- or H-cars during V-cars passage phase; and that R- and H- as V-cars can utilize the link exit lane capacity for respective direction.

23. A system for managing traffic in a road network, comprising:

a selection of different roads selected from the group consisting of at least one of motorways, larger roads, a thoroughfare, entrance roads, subareas of the network, wherein subnetworks in city areas include road network of streets with crossings, and wherein the network consists of road links, which are connected with each other via nodes, wherein said nodes can connect a variable number of links, and be designed in different ways, wherein roundabouts and four road crossings are included and various types of intersections; and wherein sensors and control means for traffic are positioned at selected links in the network, and wherein the traffic management includes a task to preserve and utilize a large capacity on selected parts of the road network, wherein said capacity at a selected cross sections includes the maximum traffic flow which can pass the cross section, and including performing said task during a time period when the traffic volume and need for capacity are large, and wherein the method for traffic management is based on selected basic principles, which means includes traffic management system, traffic sensors and control means characterized by:

a. a traffic management system including:
   a1. communication equipment, which transfer information from sensors about traffic on different links in the road network and transfer output information to control means;
   a2. a computer unit which perform processes regarding:
   a3. reduction of blocking and risk for blocking of flows on links, where blocking means cars that standing still or with low velocity wholly or partly are blocking one or several lanes for in-flows or passing through flows on a link;
   a4. where process (a3) includes the process of limiting the upstream flow to reduce the risk for blocking downstream link;
   a5. rations, where rations for traffic flows are determined for selected links and are stored;
   a6. estimation and predicting of flows for selected links;
   a7. corrections, where dynamic ration-corrections are calculated after analysis of measured or predicted flow values compared to corresponding rations;
   a8. margins for selected links;
   a9. control information regarding limitations of outflows from selected links;
   a10. deviations in traffic from valid ration for a selected link, and corrections of control information for at least one of: said link and upstream links;

b. sensors are selected for generation of traffic information including at least one of:
   flow information,
   velocity information
   queue length information
   information about numbers of cars (volume)

c. control means which are selected for control of traffic, including at least one of
   control of out-flows from links
   information about route choice
   information regarding choice of lane
   information regarding passability
   and where road links are equipped with queue-pockets respective subpockets;
   information regarding queue-pocket
   information regarding subpocket.

24. A system according to claim 23, characterized by;

a. said traffic management system being a computer based real time system;

b. said sensors being at least one of:
   loop-sensors at the road
   video-sensors
   radar-sensors
   infrared-sensors
   infra- or ultra-sound sensors
   video-sensors for information about queue-pockets or subpockets c. said control means being at least one of:
   light signals
   variable signals (mechanical or electrical).

* * * * *